United States Patent
Takami et al.

(10) Patent No.: US 6,436,462 B1
(45) Date of Patent: Aug. 20, 2002

(54) BOILED RICE FOOD CAPABLE OF BEING DISTRIBUTED AND SOLD AT LOW TEMPERATURE

(75) Inventors: Kouji Takami; Tsuyoshi Koriyama, both of Hachioji (JP)

(73) Assignee: Nippon Suisan Kaisha, Ltd., Tokyo (JP)

( * ) Notice: Subject to any disclaimer, the term of this patent is extended or adjusted under 35 U.S.C. 154(b) by 0 days.

(21) Appl. No.: 09/381,805

(22) PCT Filed: Aug. 7, 1997

(86) PCT No.: PCT/JP97/02759
§ 371 (c)(1),
(2), (4) Date: Dec. 3, 1999

(87) PCT Pub. No.: WO98/43496
PCT Pub. Date: Oct. 8, 1998

(30) Foreign Application Priority Data

Mar. 28, 1997 (JP) ............................................. 9-094531

(51) Int. Cl.[7] .............................................. A23L 1/182
(52) U.S. Cl. ....................................... 426/618; 426/112
(58) Field of Search ................................ 426/618, 112, 426/524, 508

(56) References Cited

U.S. PATENT DOCUMENTS

| 4,042,717 A | * | 8/1977 | Gayte | 426/524 |
|---|---|---|---|---|
| 4,086,369 A | * | 4/1978 | Mutoh et al. | 426/519 |
| 4,308,295 A | * | 12/1981 | Kuntz | 426/618 |
| 4,764,390 A | * | 8/1988 | Zukerman et al. | 426/438 |
| 5,308,632 A | * | 5/1994 | Howard et al. | 426/460 |
| 5,312,639 A | * | 5/1994 | Howard et al. | 426/575 |
| 5,500,242 A | * | 3/1996 | Ishida et al. | 426/618 |
| 5,543,167 A | * | 8/1996 | Onodera | 426/524 |
| 5,861,184 A | * | 1/1999 | Ishino | 426/412 |

FOREIGN PATENT DOCUMENTS

| JP | 9-206006 | 8/1997 |
|---|---|---|
| JP | 9-322725 | 12/1997 |

OTHER PUBLICATIONS

Nurunnabi, B. I. 1975. Effect of parboiling and storage on the phytic acid, inorganic and total phosphorus of some varieties of Bangladash rice. Bangladash Journal of Scientific and Industrial Research 10(1/2)38–43 abstract and paper.*

Juliano, B. O. 19785. Rice: Chemistry and Technology. The American Association of Cereal Chemists, Inc., St Paul, Minnesota. p. 44, 60, 588.*

Akira Kobayashi, "Development of new Varieties with Processing Suitability and Functional Element in Rice", Hokuriku Sakumotsu Gakkaiho (1994), vol. 29, pp 110–114 (partial translation).

Hidetsugu Fuwa et al., "Properties of Endosperm Starch of New Types of rice Grains", Nippon Shokuhin Kogyo Gakkaisi (1994), vol. 41, No. 6, pp 413–418.

J. Jane et al., "Phosphorus in Rice and Other Sarches", Cereal Foods World, Nov.–Dec. 1996, vol. 41, No. pp 11, 827–832.

Juliano, B. O et al 1993 Grain Quality Evaluation of World Rices, International Rice Research Institute, Manila, Phillipines p 103–205.

Koga 2001 Comparison of Mineral Contents in Polished Rice in Different Years Nippon Shokuhin Kagaku Kogakic Kaishi 48(8) 598.

* cited by examiner

Primary Examiner—Carolyn Paden
(74) Attorney, Agent, or Firm—Armstrong, Westerman & Hattori, LLP

(57) ABSTRACT

To provide a boiled rice food which is less likely to become hard even at low temperatures and boiled rice food or a frozen boiled rice food which can be eaten without heating.

A boiled rice food capable of being distributed and sold at low temperatures, such as sushi, characterized in that a polished rice having a phosphorus content of not less than 1,200 ppm, preferably not less than 1,300 ppm, most preferably not less than 1,400 ppm, is selected as the: starting rice material. The polished rice is preferably a non-glutinous rice having an amylose content of not more than 15%, most preferably a non-glutinous rice having an amylose content of not more than 12%, which is selected from those belonging to varieties of Ouu No.344, 343, or 354. The boiled rice food can be distributed and sold at low temperatures of 15° C. or below, preferably temperatures as low as 10° C. or below, still more preferably temperatures of 5C or below. The boiled rice food is prepared from a boiled rice prepared by boiling with a salt, such as calcium salt, added as a food additive. The salt is added by boiling using a salt-concentrated water or water with a salt added thereto. In this case no antimicrobial agent is used.

42 Claims, 1 Drawing Sheet

BOILED RICE FOOD CAPABLE OF BEING DISTRIBUTED AND SOLD AT LOW TEMPERATURE

FIELD OF THE INVENTION

This invention relates to a boiled rice food capable of being distributed and sold at low temperatures. In the concrete, this invention relates to a boiled rice food prepared from boiled rice which is less likely to become hard and remains glutinous during storage at low temperatures or after thawing after freezing.

In this invention, "distribution at low temperatures" means distribution within temperature zone below 10° C. where non-frozen food or thawed frozen food is kept unfrozen, and "sale at low temperatures" applies to the period till the time when the consumer eats the food. "Heating" means elevation of the food temperature to 50° C. or higher, where starch is re-gelatinized, by heating in a microwave oven, in hot water, etc.

BACKGROUND OF THE INVENTION

Boiled rice becomes harder with time. This phenomenon is called staling of boiled rice and the change is greater at low temperatures. Staling is the change of starch with time which is said to be caused by recrystallization of gelatinized starch by the action of water and heat. Staling of boiled rice is controlled by addition of an enzyme (α-amylase, β-amylase, glucoamylase, protease, etc.), starch (gelatinized starch, processed starch, etc.), polysaccharide (Gellan gum, hyaluronic acid, etc.), sugar (anhydro sugar, dextrin, glucose, fructosle, cyclodextrin), sugar alcohol (trehalose, multitol, sorbitol, lactitol, etc.), emulsifier (sucrose fatty acid ester, polyglycerol fatty acid ester, organic acid monoglyceride), etc. Although: each of these substances is effective to some extent, staling of boiled rice cannot be prevented completely with this technique alone. For example, plain boiled rice, when stored at 5° C. for 24 hours with one of them or some of them in combination, is hard and difficult to be eaten as it is.

For the reason described above, boiled rice which has once been stored at low temperatures requires heating in a microwave oven or by other means before eating. In a chilled lunch and prepared dish shop, for example, boiled r:ice is generally distributed and sold at 15° C. or above where staling of boiled rice is less likely in case of eating without heating. Thus distribution and sale at 15° C. or above may suppress staling of boiled rice, but in this zone of temperature, growth of bacteria is problematic which requires use of a antimicrobial agent.

Moreover, staling of starch is an obstacle to thawing of a frozen boiled rice food without heating, which is particularly evident in thawing at low temperatures without heating. In this case, the food deteriorates and the surface of boiled rice is whitened, i.e. the surface becomes wax-like. These phenomena are noted also at temperatures over 0° C. but, as described above, particularly evident after thawing of frozen boiled rice food at low temperatures. For example, rice boiled with increased amount of water is eatable for a longer time when stored unfrozen at low temperatures. However, when boiled rice has once been frozen and then thawed at low temperatures, deterioration of texture is slightly prevented by increased water, but wax-like appearance is rather more marked. Thus deterioration of a boiled rice food is more marked after gradual thawing of frozen boiled rice food than after storage of unfrozen food at low temperatures. That is, texture deteriorates and wax-like appearance appears more rapidly in the thawing temperature zone below 0° C., particularly in the range from –5° C. to 0° C. Therefore for thawing of frozen boiled rice food, it is necessary to pass the temperature zone ranging from –5° C. to 0° C. rapidly by thawing with heating in a microwave oven or in hot water, or by spontaneous thawing at ordinary or higher temperatures. For this reason there is no frozen boiled rice article that can be thawed at low temperatures, and frozen boiled rice is not distributed or sold at low temperatures.

Moreover, the extent of staling is different among types of boiled rice foods. For example, sushi is far less liable to stale than rice ball; frozen sushi articles are available which are eaten after thawing at ordinary or higher temperatures, while there are no frozen rice ball articles that do not require heating in a microwave oven before eating. Chilled sushi articles distributed at 7 to 10° C. are available, whereas there are no other boiled rice articles that are distributed at low temperatures, particularly at chilled temperatures below 5° C. where bacteria grows scarcely and no antimicrobial agent is required. Namely it is desirable that chilled sushi now distributed at 7 to 10° C. is distributed at lower temperatures for the fish materials to be kept as fresh as possible, but the technique for distribution of boiled rice at 5° C. has not been established yet. Sushi is less liable to stale because seasonings such as sugar make sushi slightly resistant to staling and because eating boiled rice together with fish materials obscures the texture of boiled rice.

Glutinous rice, having properties genetically different from those of non-glutinous rice, is known to be resistant to staling. However glutinous rice is not suitable for above-mentioned prepared dish because of its peculiar odor and the undesirable texture due to excessive glutinousness.

DISCLOSURE OF THE INVENTION

The purpose of this invention is to provide a boiled rice food which is less liable to become hard even after storage at low temperatures or after thawing after freezing, and prepared from polished rice having a phosphorus content of not less than 1,200 ppm, which is preferably non-glutinous rice having an amylose content of not more than 15%. The purpose of this invention is to provide a boiled rice food distributed at low temperatures or a frozen boiled rice food which is eatable without heating.

The inventors have found that a low-amylose rice having a phosphorus content of not less than 1,200 ppm and an amylose content of not more than 15% is resistant to staling, and that such rice is suitable for distribution and sale at low temperatures. This invention has been made based on this finding.

The gist of this invention is a boiled rice food that can be distributed and sold at low temperatures characterized in that a polished rice having a phosphorus content of not less than 1,200 ppm, preferably not less than 1,300 ppm, most preferably not less than 1,400 ppm has been selected as the starting rice material, preferably a frozen-chilled boiled rice food which can be eaten without heating, and most preferably sushi. The starting material rice of this invention is :a non-glutinous rice, preferably a non-glutinous rice having an amylose content of not more than 15%, most preferably a non-glutinous rice having an amylose content of not more than 12%, selected from those belonging to varieties of Ouu No.344, 343, or 354. The boiled rice food of this invention that can be distributed and sold at low temperatures is a boiled rice food that can be distributed and sold at low temperatures of 15° C. or below, preferably temperatures as low as 10° C. or below, still more preferably temperatures of 5° C. or below. The boiled rice food of this invention that can be distributed and sold at low temperatures is prepared from al boiled rice prepared by boiling with a salt such as Ca salt as a food additive, and such salt is added by boiling with salt-concentrated water or salt-added water, and is characterized in that no: antimicrobial agent is needed because the food can be distributed at low temperatures. The frozen boiled rice food is characterized in that such food is prepared by block freezing or by compressed molding or by in vacuo packaging.

"Phosphorus content" in this invention is based on the value obtained by colorimetry where rice polished to 90% (Attention should be paid to the degree of polishing in measurement of phosphorus content because phosphorus in rice is rich in the aleuron layer.) is hydrolyzed with sulfuric acid followed by determination using vanadomolybdophosphoric acid, and expressed as the content in dried material. Phosphorus content in 21 varieties of rice as determined with this method varied from 1,079 to 1,699 ppm, among which low-amylose rice having a phosphorus content of more than 1,300 ppm was particularly resistant to staling.

Phosphorus in rice is known to be present in the form of phytic acid, phospholipid, and phosphorus in starch. Phytic acid is hexaphosphoric acid ester of myo-inositol, and occurs as a reserve substance of phosphoric acid in seeds of cereals. Phospholipid in rice occurs in the form of phosphatidylcholine, phosphatidylethanolamine, etc., which are being used as food surfactants. Phosphorus in starch is known to be rich in rhizome starch, and it is also known about potato starch that bound phosphoric acid is inhibitory to a.-amylase and is localized to the amylopectin fraction of starch. (However the inventors could not confirm that there is a correlation between the phosphorus content and amylopectin content in low-amylose rice varieties.) According to the result of measurement of phosphorus in starch by the inventors, the content of phosphorus extracted with the cold alkali method from non-defatted starch was 92 to 211 ppm in Ouu No.344 which is resistant to staling (amylose content; 11.3%) and 68 ppm in Milky Queen which is less resistant to staling (amylose content; 10.8%) than Ouu No.344; the phosphorus content tends to be higher in varieties which are more resistant to staling, as seen about the phosphorus content in rice, suggesting that phosphorus content in starch, though non-defatted, may be related to resistance to staling.

It was also found that, when the content of phytic acid rich in the aleuron layer was decreased by polishing of Ouu No.344 and Milky Queen (phosphorus content was 1,673 ppm and 1,277 ppm after 90% polishing, 1,225 ppm and 946 ppm after 85% polishing, and 1,104 ppm and 809 ppm after 80% polishing of Ouu No.344 and Milky Queen, respectively), resistance to staling was kept unchanged for Milky Queen but rather increased with increase of polishing rate for Ouu No.344. This indicates that phytic acid does not take part in resistance :to staling, and that it is more probable that phospholipid and phosphorus in starch may take part in resistance to staling.

Phosphorus atoms in starch are known to be bound to the carbon atoms of the 2-, 3-, and 6-position in the glucose molecule to form ester bonds mostly in the B chain, more precisely most of phosphorus atoms are in the outer chains of the B chain. Based on the fact that these phosphorus atoms are bound at 9 or more glucose residues away from the branched residue, it has been reported that there may be a phosphorylation enzyme that can recognize the chain length. On the assumption that phosphorus atoms bound to starch are involved in resistance to staling from these findings, it will be possible to select and breed efficiently low-amylose rice varieties with high resistance to staling by using such a phosphorylation enzyme as an index or by a technique of gene transfer.

"Amylose content" in this invention represents the apparent amylose content as measured with the iodine affinity measurement method or the iodine colorimetry, which is different from the real amylose content. Amylose is generally defined as a starch fraction that comprises glucose units joined by $\alpha$-1,4-links, but the actual amylose fraction contains more or less ($\alpha$-1,6-links. Therefore the apparent amylose content as determined based on the affinity between amylose and iodine is frequently used as the amylose content. The amylose content is expressed on the dried substance basis, and the amylose content in non-glutinous rice generally harvested in Japan is 15 to 22 weight % as determined by the methods described above. In general, there is a close relationship between amylose content and staling of starch; it is said that the higher the content the more easily staling proceeds. However, the results of the inventors' investigation showed that there is no relation between amylose content and resistance to staling of low-amylosse rice. Namely, the amylose content in Ouu No.344 and Ouu No.343, of which resistance to staling is kept stable without the influence of the year of harvest, ranges broadly from 3.7 to 13.6 weight %. In other words, the resistance to staling of low-amylose rice cannot be explained by the amylose content alone, suggesting that other factors may play important roles. Resistance to staling in this invention is detectable in rice having a phosphorus content of not less than 1,200 ppm and an amylose content of not more than 15%, and remarkable in rice having a phosphorus content of not less than 1,300 ppm and an amylose content of not more than 12%.

There are 5 varieties of low-amylose rice that have been registered according to the Law for the Protection of New Varieties of Plants; Ouu No.344, Milky Queen, Soft 158, Aya, and Saikai No.215. Amylose mutant lines for pollinator include the isogenic line derived from the cultivar, "Kinnanpu", and the isogenic line derived from the cultivar, "Kochihibiki", both of which are resistant to staling. Particularly Ouu No.344 and even non-registered seedlings such as Ouu No.343, Ouu No.354 and G14 are confirmed to have remarkable resistance to staling. Among these low-amylose rice varieties, the higher the phosphorus content the more resistant to staling, and this is evident particularly for varieties having a phosphorus content of not less than 1,300 ppm. The phosphorus content of Ouu No.344 and its sister variety Ouu No.343 which are very resistant to staling among low-amylose rice varieties is always high; the mean phosphorus content of 7 samples harvested in 1994 to 1996 is 1,500 ppm, while the mean content of 8 samples of other varieties was 1,228 ppm. The phosphorus content of Ouu No.344 and its sister variety Ouu No.343 is stable at a higher level ranging from 1,389 to 1,630 ppm. Some of low-amylose rice varieties harvested in some years are as resistant to staling as Ouu No.344; for example, Soft 158 harvested in 1996 which was as resistant as Ouu No.344 harvested in 1994 to 1996 had a phosphorus content of 1,430 ppm, which was higher than the less resistant Soft 158 harvested in 1995 (1,235 ppm). These findings suggest that the phosphorus content may have some relation to resistance to staling.

If a new variety of low-amy;lose rice having a phosphorus content of not less than 1,300 ppm is selected for upbringing, it will be very resistant to staling. Use of a phosphorus-enriched fertilizer will increase the phosphorus content in rice. It is still unknown which of the above-mentioned components of rice is enriched with phosphorus, but resistance to staling may be improved by controlling fertilization.

In addition, resistance to staling may be enhanced further by addition of a food additive before or after boiling low-amylose rice having a high content of phosphorus. Food additives most suitable for this purpose are salts; Na, K, Mg, and Ca salts may enhance resistance to staling irrespectively of their anions, and the effect is particularly marked, with Ca. Such a salt is added preferably to the amount that has no influence on the taste; addition of not less than 100 ppm in the final product is appropriate and the effect is marked after addition of not less than 500 ppm. Besides addition of salts, concentration of the salts naturally contained in water may produce a similar effect, and the representative method of concentration is use of a reverse osmosis membrane. The inventors have confirmed that boiling rice with such a salt added or with salt-concentrated water is particularly effective for Ouu No.344, probably because Ouu No.344 is so reactive with salts that it possesses higher resistance to staling than other rice varieties.

For the same reason why the addition of salts enhances the resistance to staling, a seasoning added boiled rice is enhanced the resistance to staling. It is the above-mentioned effect of salts that makes rice ball and sushi more resistant to staling than plain boiled rice. Moreover, these salts are expected to interact with other additives to intensify resistance to staling. For example, when a frozen boiled rice food prepared with Ca salts added is thawed at low temperatures, sushi is deteriorated less than rice ball. This may be ascribable to the synergistic effect of the seasonings and salts in sushi. Like the effect of salts, the effect of addition of a seasoning is high for Ouu No.344.

Some other additives may improve resistance to staling. Addition of a food enzyme, such as $\alpha$-amylase, $\beta$-amylase, glucoamylase, or protease, to the concentration of 0.01 to 100 U/g rice is effective, which may be added before or after boiling rice. Starch products such as waxy corn starch with a high amylopectin content, glutinous rice flour, tapioca starch, or modified starch, or degradates thereof, are suitable, and added suitably to the concentration of 0.5 to 20% (w/w) of raw rice. Among other saccharides, Gellan gum (0.1 to 5.0% of raw rice), hyaluronic acid (0.05 to 0.8% of raw rice), anhydrosugars (0.3 to 30% of raw rice), dextrin (0.5 to 20% of raw rice), cyclodextrin (0.5 to 20% of raw rice), and oligosugars (0.5 to 20%) are desirable (in parentheses: w/w). Sugar alcohols such as trehalose, lactitol, maltitol, and sorbitol improve resistance to staling, of which appropriate amount to be added is 0.1 to 10% of raw rice. Among emulsifiers, sucrose fatty acid esters, polyglycerol fatty acid esters, organic acid monoglycerides, lysolecithin, and diglycerol fatty acid esters are effective when added, and preferably an emulsifier with HLB of 12 or more is added to a concentration of 0.05 to 1.0 weight % of raw rice.

Distribution at low temperatures in this invention is distribution at temperatures of not more than 10, covering distribution of boiled rice at temperatures within the range where rice is liable to be staled around 5° C., as well as thawing and distribution at low temperatures of frozen boiled rice foods unsuitable for thawing at low temperatures. Generally heating in a microwave oven etc. is necessary for the boiled rice food distributed within this range of temperature to regain the texture like just after boiling, but this invention makes it possible to keep the texture like just after boiling without heating in a microwave oven etc. When heated in a microwave oven the boiled rice of this invention is more tasteful than the boiled rice usually distributed. This is because staled amylose is more resistant to re-gelatinization; low-amylose rice with an amylose content lower than in usual non-glutinous rice gives softer and more glutinous texture when re-heated.

This invention also makes a frozen boiled rice food eatable after thawing at low temperatures. A representative frozen boiled rice food to be thawed at low temperatures is frozen sushi. Fish and shell fish materials of frozen sushi are liable to be deteriorated when thawed by heating. This invention made it possible to obtain the texture of boiled rice like just after boiling even by thawing at low temperatures, so that not only boiled rice but also fish and shell fish keep their texture like just after preparation. Similarly, this invention is also applicable to frozen rice ball, pilaf, boiled rice with assorted mixtures, etc., which are tasteful after thawing: at low temperatures as well as after heating in a microwave oven.

For a frozen boiled rice food to be eaten without heating, it is important to be provided in the form where thawing speed can be controlled. This is important because the quality of a frozen boiled rice food is not greatly affected by freezing speed unless the speed is too low, but affected greatly by the time required for passing through the thawing temperature range from $-5°$ C. to $0°$ C. Thus the quality is highly dependent on how fast the frozen food passes through this temperature range. Therefore for frozen boiled rice foods prepared from usual rice which are expected to be thawed at low temperatures, IQF individual freezing is suitable, while block-frozen or compressed-molded articles are not suitable because thawing speed is low in these articles. However, when low-amylose rice which is very resistant to staling is used, thawing speed affects little the quality, and therefore foods in blocks or compressed-molded foods become eatable. For the same reason, a smaller amount of air in package is more effective from the view point of thermal efficiency, and a package having a larger area in contact with air during thawing is more desirable. Therefore in vacuo deep drawing packaging is most suitable for frozen boiled rice foods to be thawed at temperatures lower than usual temperature.

For boiling of low-amylose rice in a large scale, the steaming boiling procedure is suitable where the processes of primary steaming, secondary boiling, and secondary steaming are performed in sequence in a sequential rice-cooker. The soluble component of low-amylose rice is more abundant in amylopectin and more glutinous as compared with common non-glutinous rice. Therefore when low-amylose rice is boiled in a kettle, the viscosity of water during boiling becomes high which results in insufficient convection. This is the cause of scorching due to overheating at the bottom of the kettle, with rice near the surface or inside of the kettle remaining uncooked inside. For addition of an additive during steaming-boiling of rice, the process of secondary steaming is most suitable.

BEST EMBODIMENTS OF THE INVENTION

This invention is explained in detail in the following Examples. This invention is not limited at all by these Examples.

EXAMPLE 1

Sixteen varieties of low-amylose rice harvested in 1994 to 1996 were boiled in 1.35 volumes of water, and the boiled rice was stored at 5° C. for 24 hours and then subjected to the sensory evaluation. In the sensory evaluation, the hardness of boiled Koshihikari rice harvested in Ibaragi Prefecture in 1.35 volumes of water was defined as 0, and that of boiled Koshihikari rice harvested in Ibaragi Prefecture in 1.2 volumes of water was defined as 1. The panel consisted of ten well-trained panelists specialized in boiled rice.

Figure 1:
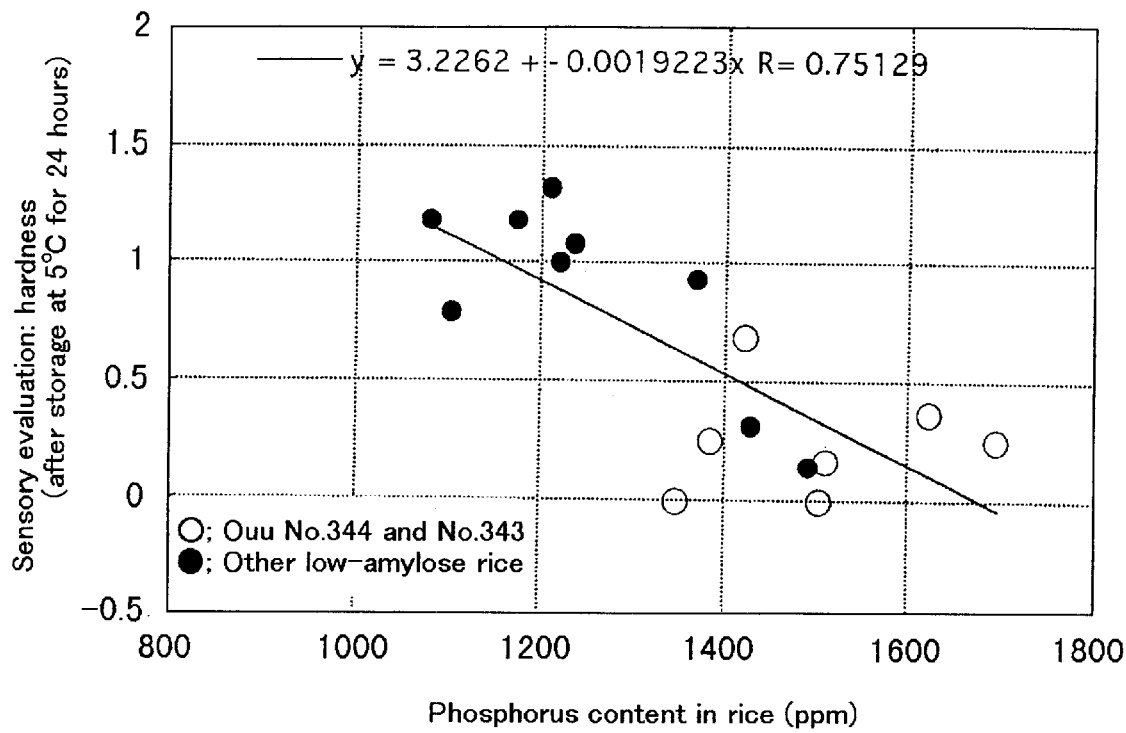
FIG. 1 shows the relationship between resistance to staling and phosphorus content of low-amylose rice.

The phosphorus content was determined by colorimetry using vanadomolybdophosphoric acid after hydrolysis of powdered polished rice with sulfuric acid. The phosphorus content was expressed on the dry weight basis. The relationship between the result of sensory evaluation after storage at 5° C. for 24 hours and the phosphorus content is shown. in FIG. 1.

Resistance to staling as determined by the sensory evaluation and the phosphorus content in polished rice were closely related to each other. In particular, low-amylose rice having a phosphorus content of not less than 1,300 ppm after storage at 5° C. for 24 hours had softer texture than Koshihikari rice just after boiling in 1.2 volumes of water, and eatable even without re-heating. Independently of the year of harvesting, Ouu No.344 and Ouu No.343, which are very resistant to staling, had a phosphorus content of not less than 1,300 ppm in the harvests in 1994 to 1996.

REFERENCE EXAMPLE 1

Figure 2:
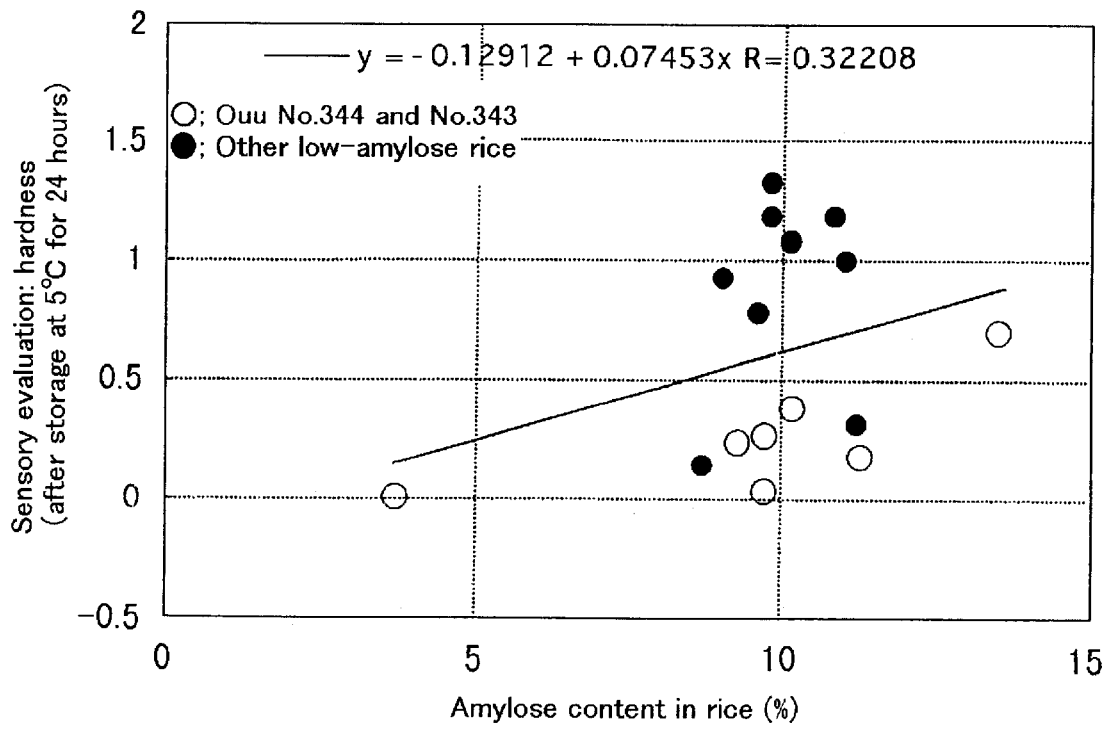
FIG. 2 shows the relationship between resistance to staling and amylose content of low-amylose rice.

The relationship between the result of the sensory evaluation in Example 1 and the amylose content as measured by iodine colorimetry is shown in FIG. 2. It is said that there is a relationship between amylose content and resistance to staling in general, but the relationship could not be confirmed by the inventors.

EXAMPLE 2

Various products were prepared from boiled rice in 1.35 volumes of water in a commercially available rice cooker. Each product was subjected to the sensory evaluation after storage at 5° C. for 24 hours for a non-frozen product, or after thawing by storage at 5° C. for 24 hours for a frozen product prepared by freezing at −35° C. The panel consisted of 10 well-trained panelists specialized in boiled rice, and judged whether the product was valuable as an article of commerce. The product which was judged to be eatable by all panelists, the product which was judged to be eatable by half or more of the panelists, and the product which was judged to be uneatable by half or more of the panelists are marked with ○, Δ, and X, respectively, in Table 1.

TABLE 1

|  | plain boiled rice | | rice ball | | sushi | |
| --- | --- | --- | --- | --- | --- | --- |
|  | non-frozen | frozen | non-frozen | frozen | non-frozen | frozen |
| Ouu No. 344 | ○ | x | ○ | ○ | ○ | ○ |
| Milky Queen | ○ | x | ○ | Δ | ○ | Δ |
| Koshihikari | Δ | x | Δ | x | ○ | x |

For all varieties, non-frozen products (stored at 5° C. for 24 hours) had better qualities than frozen products (thawed and stored at 5° C. for 24 hours), and rice ball and sushi which were prepared with seasonings had smaller changes in quality than plain boiled rice. For non-frozen products, all of the products of low-amylose rice Ouu No.344 and Milky Queen were eatable, while only sushi was eatable when prepared from Koshihikari. For frozen products, none of the products of plain boiled rice was eatable, while rice ball and sushi products were eatable only when prepared from Ouu No.344.

EXAMPLE 3

Sushi was prepared from boiled Milky Queen rice in 1.35 volumes of water in a commercially available rice cooker, and 10 pieces of sushi placed on a tray were packed by packaging without vacuum or by in vacuo packaging. Each sample was frozen at −35° C., stored at 5° C. for 24 hours, and subjected to the sensory evaluation. The panel consisted of 10 well-trained panelists specialized in boiled rice who evaluated texture according to the criteria described in Example 1 and appearance according to the criteria where the appearance of boiled Ibaragi Koshihikari in 1.2 volumes of water as the standard was defined as 0, the appearance slightly inferior to that of the standard was rated as −1, and the appearance inferior to that of the standard was rated as −2. Means of ratings were calculated and the result is shown in Table 2.

TABLE 2

|  | hardness in texture | appearance | time for passing from −5 to 0° C. |
| --- | --- | --- | --- |
| packaging without vacuum | 0.67 | −1.07 | 7 hours |
| in vacuo packaging | −1.30 | −0.07 | 4 hours |

In vacuo packaging shortened the time for elevating the temperature from −5° C. to 0° C. and thus made deterioration due to thawing and storage smaller and reduced wax-like appearance.

INDUSTRIAL APPLICABILITY

Use of low-amylose rice having a phosphorus content of not less than 1,200 ppm and an amylose content of not more than 15 weight % could provide boiled rice with little deterioration in texture during storage at low temperatures.

What is claimed is:

1. A boiled rice food product, comprising polished rice having a phosphorus content of not less than 1,200 ppm and an amylose content of not more than 15%, wherein said boiled rice food product does not require reheating and is made by
   providing polished rice having a phosphorus content of not less than 1,200 ppm and an amylose content of not more than 15% after polishing as the starting rice material;
   boiling the polished rice; and
   storing the boile[0084] rice i[008e] a lump shape under a temperature below 10° C. for at least 24 hours.
2. A boiled rice food of claim 1, wherein said polished rice has a phosphorus content of not less than 1,300 ppm.
3. A boiled rice food of claim 2, wherein said polished rice has a phosphorus content of not less than 1,400 ppm.
4. A boiled rice food of any one of claims 1, 2, or 3, wherein said polished rice is non-glutinous rice.
5. A boiled rice food of claim 4, wherein the non-glutinous rice has an amylose content of not more than 15 weight %.

6. A boiled rice food of claim 5, wherein the non-glutinous rice has an amylose content of not more than 12 weight %.

7. A boiled rice food of claim 4, wherein the non-glutinous rice belongs to varieties of Ouu No. 344, Ouu No. 343, and Ouu No. 354.

8. A boiled rice food of claim 1, wherein said boiled rice food is sushi.

9. A boiled rice food of claim 1, wherein said boiled rice food is a frozen food.

10. A boiled rice food of claim 9, wherein the frozen food is eatable without heating.

11. A boiled rice food of claim 10, wherein the frozen food is a block-frozen food.

12. A boiled rice food of claim 9 or 10, wherein said frozen food is prepared by compression molding.

13. A boiled rice food of any one of claims 9, 10 or 11, wherein the frozen food is packaged by in vacuo packaging.

14. A boiled rice food of claim 13, wherein the frozen food is packaged by deep drawing packaging.

15. A boiled rice food of claim 1, wherein the food can be distributed and sold at temperatures of not more than 10° C.

16. A boiled rice food of claim 15, wherein the food can be distributed and sold at temperatures of not more than 5° C.

17. A boiled rice food of claim 17, wherein said boiled rice food is prepared from boiled rice cooked with a food additive.

18. A boiled rice food of claim 17, wherein the food additive is a salt.

19. A boiled rice food of claim 18, wherein said salt is a Ca salt.

20. A boiled rice food of claim 18, wherein said salt is added by boiling rice in salt-concentrated water or in salt-added water.

21. A boiled rice food of any one of claims 17 to 20, wherein the food is prepared with a seasoning added.

22. A boiled rice food of claim 1, wherein no antimicrobial agent is used in said boiled rice food.

23. A process of serving a boiled rice food product, comprising the steps of: providing polished rice having a phosphorus content of not less than 1,200 ppm and an amylose content of not more than 15% after polishing as the starting rice material;

boiling the polished rice; and storing the boiled rice in a lump shape under a temperature below 10° C. for at least 24 hours, wherein the boiled rice product does not require reheating.

24. The process of serving a boiled rice of claim 23, wherein said polished rice has a phosphorus content of not less than 1,300 ppm.

25. The process of serving a boiled rice of claim 23, wherein said polished rice has a phosphorus content of not less than 1,400 ppm.

26. The process of serving a boiled rice of claim 23, wherein said polished rice is non-glutinous rice.

27. The process of serving a boiled rice of claim 26, wherein the non-glutinous rice has an amylose content of not more than 15 weight %.

28. The process of serving a boiled rice of claim 26, wherein the non-glutinous rice has an amylose content of not more than 12 weight %.

29. The process of serving a boiled rice of claim 26, wherein the non-glutinous rice belongs to varieties of Ouu No. 344, Ouu No. 343, and Ouu No. 354.

30. The process of serving a boiled rice of claim 23, wherein said boiled rice food is sushi.

31. The process of serving a boiled rice of claim 23, wherein said boiled rice food is a frozen food.

32. The process of serving a boiled rice of claim 31, wherein the frozen food is a block-frozen food.

33. The process of serving a boiled rice of claim 31, wherein said frozen food is prepared by compression molding.

34. The process of serving a boiled rice of claim 31, wherein the frozen food is packaged by in vacuo packaging.

35. The process of serving a boiled rice of claim 31, wherein the frozen food is packaged by deep drawing packaging.

36. The process of serving a boiled rice of claim 23, wherein the food can be distributed and sold at temperatures of not more than 5° C.

37. The process of serving a boiled rice of claim 23, wherein said boiled rice food is prepared from boiled rice cooked with a food additive.

38. The process of serving a boiled rice of claim 37, wherein the food additive is a salt.

39. The process of serving a boiled rice of claim 38, wherein said salt is a Ca salt.

40. The process of serving a boiled rice of claim 38, wherein said salt is added by boiling rice in salt-concentrated water or in salt-added water.

41. The process of serving a boiled rice of claim 23, wherein the food is prepared with a seasoning added.

42. The process of serving a boiled rice of claim 23, wherein no antimicrobial agent is used in said boiled rice food.

* * * * *